US009837690B2

(12) United States Patent
Janarthanam et al.

(10) Patent No.: US 9,837,690 B2
(45) Date of Patent: Dec. 5, 2017

(54) BATTERY COOLING FAN MOUNTING

(71) Applicant: FORD GLOBAL TECHNOLOGIES, LLC, Dearborn, MI (US)

(72) Inventors: Suriyaprakash A. Janarthanam, Westland, MI (US); Masahiro Kimoto, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 740 days.

(21) Appl. No.: 13/955,406

(22) Filed: Jul. 31, 2013

(65) Prior Publication Data

US 2015/0037629 A1 Feb. 5, 2015

(51) Int. Cl.

| | |
|---|---|
| ***H01M 10/613*** | (2014.01) |
| ***H01M 10/625*** | (2014.01) |
| ***H01M 10/6563*** | (2014.01) |
| ***B60L 11/18*** | (2006.01) |
| *H01M 10/6556* | (2014.01) |

(52) U.S. Cl.

CPC ....... *H01M 10/613* (2015.04); *B60L 11/1879* (2013.01); *H01M 10/625* (2015.04); *H01M 10/6563* (2015.04); *H01M 10/6556* (2015.04); *H01M 2220/20* (2013.01); *Y02T 10/7005* (2013.01); *Y02T 10/705* (2013.01)

(58) Field of Classification Search

CPC ......... H01M 10/5004; H01M 10/5016; H01M 10/5057; H01M 10/5067; H01M 10/613; H01M 10/625; H01M 10/6563; B60L 11/1879

See application file for complete search history.

(56) References Cited

U.S. PATENT DOCUMENTS

| | | | | |
|---|---|---|---|---|
| 6,547,020 | B2 | 4/2003 | Maus et al. | |
| 7,654,351 | B2 | 2/2010 | Koike et al. | |
| 7,967,093 | B2 | 6/2011 | Nagasaka | |
| 2009/0120702 | A1* | 5/2009 | Yoda | 180/68.1 |

FOREIGN PATENT DOCUMENTS

| | | | |
|---|---|---|---|
| JP | 2004311139 | A | 11/2004 |
| JP | 2013086605 | A | 5/2013 |
| KR | 20120039795 | A | 4/2012 |
| WO | WO 2012175859 | A2 * | 12/2012 |

OTHER PUBLICATIONS

Machine translation of description of WO 2012/175859 A2.*

* cited by examiner

*Primary Examiner* — Jonathan Jelsma

(74) *Attorney, Agent, or Firm* — David B. Kelley; MacMillan, Sobanski & Todd, LLC

(57) ABSTRACT

A vehicle having: vehicle structure including a pair of opposed sides and a rear, with a floor extending horizontally between the sides and rear; a battery-pack mounted above the floor; a fan assembly having a housing with a motor mounted therein directly behind the battery-pack, with the housing including a pair of flanges having U-slots with slot openings facing downward; and fasteners extending horizontally through the U-slots and secured to the battery-pack.

13 Claims, 3 Drawing Sheets

40 46 62 66 54 59 70 52 34 36 59 70 48 52 60 32 42 50 54 58 56

BATTERY COOLING FAN MOUNTING

BACKGROUND OF INVENTION

The present invention relates to a vehicle battery pack assembly, and more particularly to the mounting of a fan assembly that cools the battery pack.

In vehicles that employ batteries for propulsion, such as for example, hybrid electric or battery electric vehicles, the batteries are often located behind the rear seats in a rear cargo area. The battery system may include a cooling fan assembly that creates a cooling flow inside the battery to maintain the desired battery temperature. While it may be desirable from a packaging and cooling efficiency standpoint to locate the cooling fan assembly right next to the batteries, it is not desirable to have the fan assembly pushed into the batteries during a vehicle impact event.

Accordingly, some have mounted the cooling fan motor and that portion of the cooling fan assembly offset laterally to the side of the batteries. In this way, in a vehicle rear impact event, the fan motor likely will not be pushed into the batteries. Others have mounted the cooling fan motor and that portion of the cooling fan assembly offset above the batteries, again reducing the chances that the fan motor is pushed into the batteries during a vehicle rear impact event. However, for some vehicles, it may be difficult due to packaging constraints or possibly less efficient for cooling to locate the cooling fan assembly offset from the batteries.

SUMMARY OF INVENTION

An embodiment contemplates a vehicle having: vehicle structure including a pair of opposed sides and a rear, with a floor extending horizontally between the sides and rear; a battery-pack mounted above the floor; a fan assembly having a housing with a motor mounted therein directly behind the battery-pack, the housing including a pair of flanges having U-slots with slot openings facing downward; and fasteners extending horizontally through the U-slots and secured to the battery-pack.

An advantage of an embodiment is that the cooling fan assembly for the battery-pack may be mounted in the vehicle directly behind the battery-pack, while minimizing a risk of the cooling fan assembly, and especially the motor unit, from damaging battery-pack internal components during a vehicle rear impact event. This allows for flexibility in locating the cooling fan assembly taking into account packaging, weight, and efficiency constraints. Moreover, the mounting of the cooling fan assembly is relatively simple, quick, while still allowing for the desired functionality during a vehicle rear impact event.

DETAILED DESCRIPTION

Figure 1:
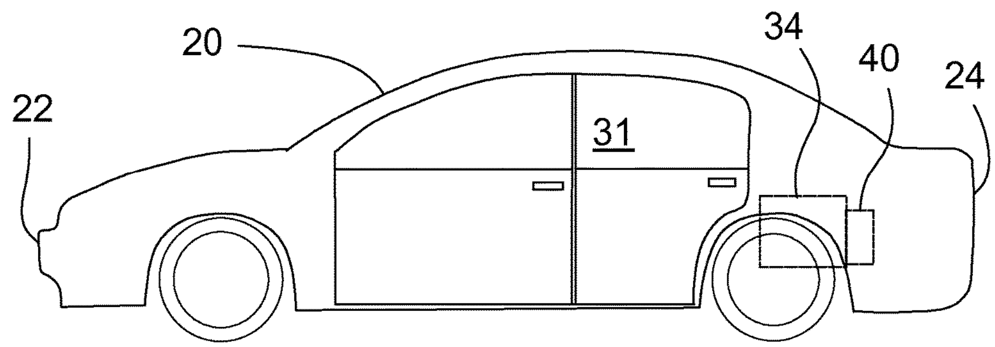
FIG. 1 is a schematic, side view of a portion of a vehicle.
Figure 2:
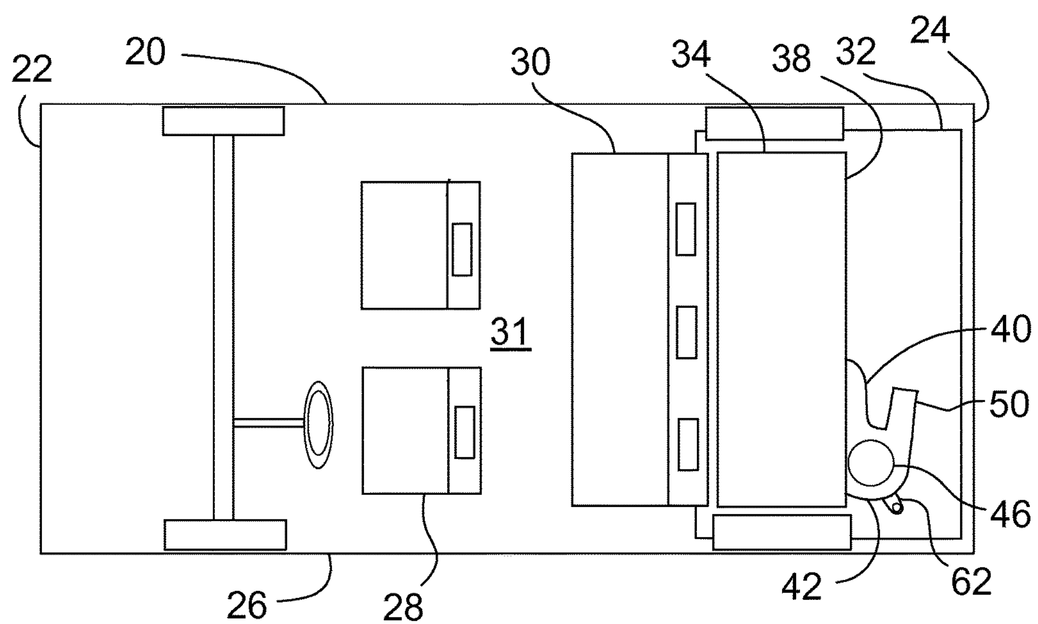
FIG. 2 is a schematic, plan view of a portion of a vehicle.
Figure 3:
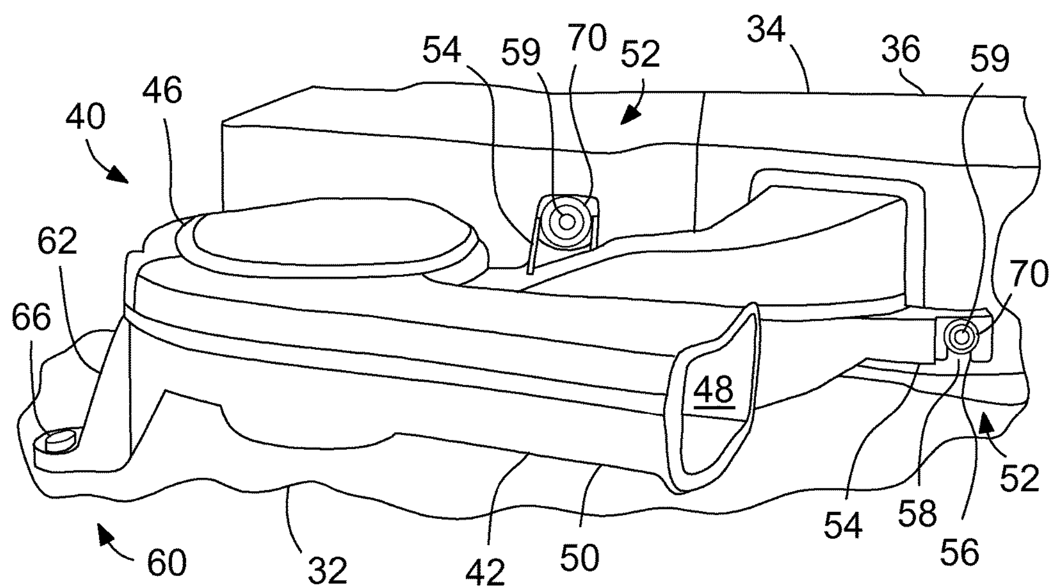
FIG. 3 is a schematic, perspective view of a cooling fan assembly mounted to a portion of a battery-pack.
Figure 4:
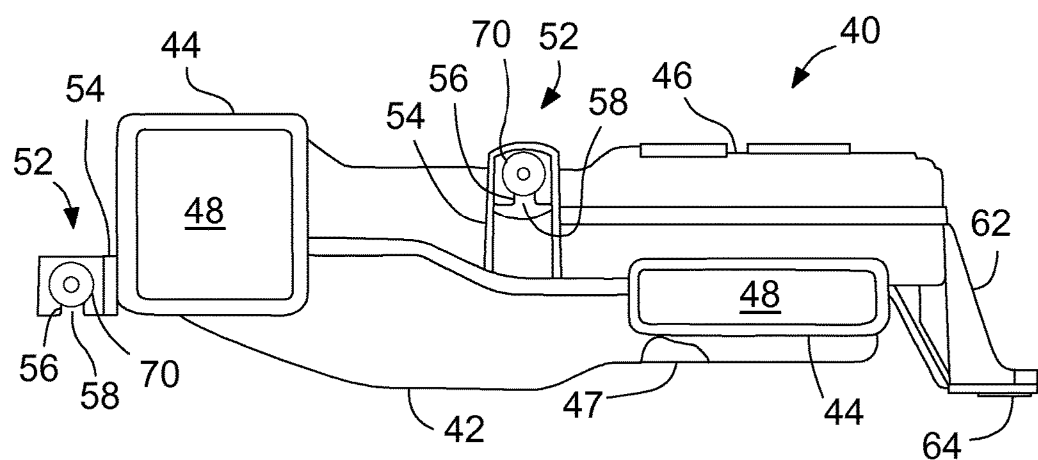
FIG. 4 is a schematic, side view looking rearward at the cooling fan assembly.
Figure 5:
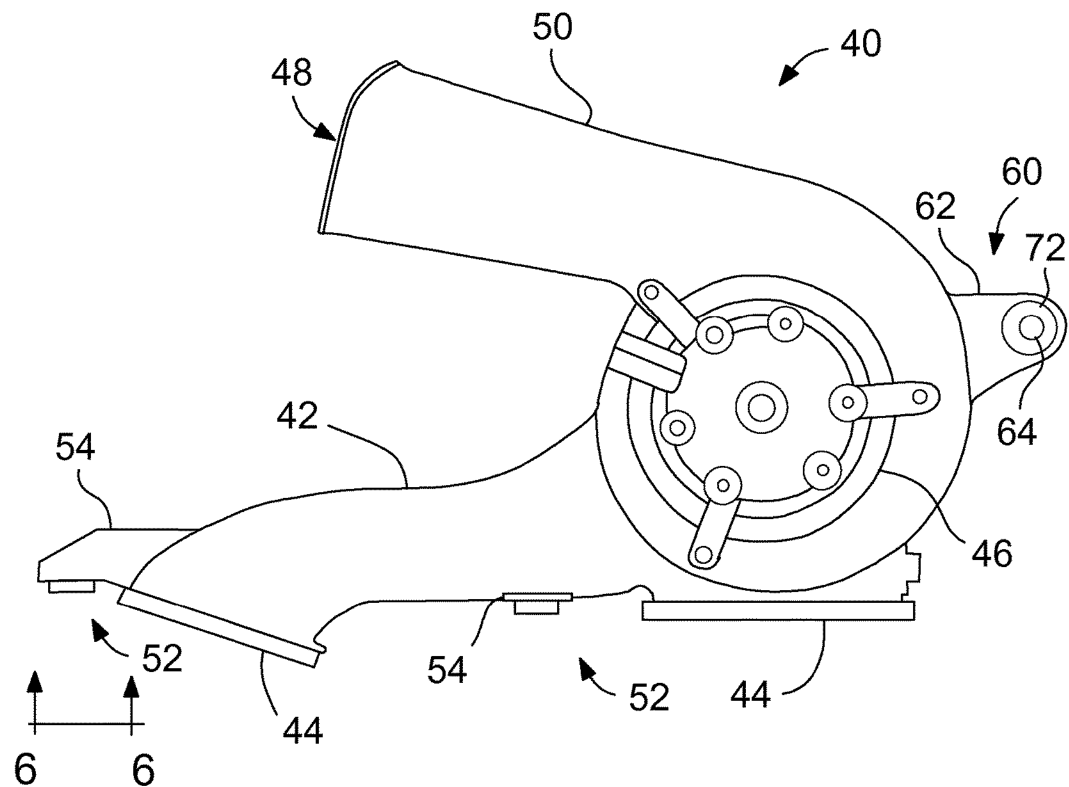
FIG. 5 is a schematic, plan view of the cooling fan assembly.
Figure 6:
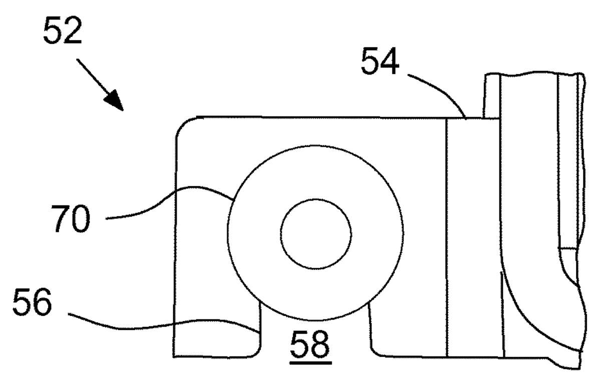
FIG. 6 is an enlarged, schematic view looking in the direction of arrows 6-6 in FIG. 5.

FIGS. 1 and 2 show an automotive vehicle 20 having a front end 22 and a rear end 24, as well as two sides 26. The vehicle 20 includes front seats 28 and rear seats 30 in a passenger compartment 31. A rear portion of a floor 32 is located behind the rear seats 30 and extends between the sides 26 to the rear end 24 of the vehicle 20.

Mounted above the floor 32, behind the rear seats 30 is a battery-pack 34. The term battery-pack, as used herein, may include other electronic components, such as power electronics, in addition to the actual battery cells themselves (not shown). A housing 36 of the battery-pack 34 includes a rear wall 38 that includes fluid flow openings that correspond to fluid flow openings in a cooling fan assembly 40.

The cooling fan assembly 40 will now be discussed relative to FIGS. 1-6. The cooling fan assembly 40 includes a fan housing 42. The fan housing 42 may be formed from plastic, or other suitable material. A pair of front ducts 44 include openings 46 in fluid communication with openings in the housing 36 to allow for fluid flow, such as air flow, between the battery-pack 34 and the fan housing 42. This fluid flow may be air drawn from the passenger compartment 31, through the battery-pack 34 to maintain a desired temperature range, and into the fan housing 42 via the front ducts 44. The fluid may then be drawn through fan vanes in a motor unit and vane assembly 46 by operating the motor 47 to spin the vanes. The air pressure from the vanes then pushes the fluid through an opening 48 in an outlet duct 50 of the fan housing 42.

The cooling fan assembly 40 is secured in the vehicle 20 at three mounting locations. A first pair of mounting locations 52 include a pair of mounting flanges 54 extending from the fan housing 42 into contact with the battery-pack housing 36. Each of the mounting flanges 54 includes a U-shaped slot 56 (hereinafter referred to as U-slots). Each U-slot 56 has a bottom opening 58. A fastener 59 extends through each U-slot 56 to secure the cooling fan assembly 40 to the battery-pack housing 36 via the mounting flanges 54. Thus, each U-slot 56, having a closed top portion of the mounting flange 54, will support the weight of the fan assembly 40, but still allow for a generally upward force to push the fan assembly 40 upward relative to the battery-pack 34. Each of the fasteners 59 may be, for example, a nut and bolt, a screw or other similar type of fastener, and may include grommets 70 mounted in the U-slots 56. The grommets 70 may have circular portions on each side of the corresponding flange 54, with a smaller diameter portion extending through the respective U-slot 56.

A remaining mounting location is a floor mount 60, which includes a support arm 62 extending downward and somewhat radially out from a portion of the fan housing 42 adjacent to the motor unit and vane assembly 46. The support arm 62 includes a floor mount hole 64, which may be circular. A fastener 66 extends through the mount hole 64 to secure the support arm 62 to the floor 32 of the vehicle 20. This fastener 66 may also include a grommet 72, if so desired.

The flanges 54 and support arm 62 are configured to support the fan assembly 40, and in particular, the motor 47, directly behind the battery-pack 34. When using the term "directly behind" herein, this means that the particular component is adjacent to a second component, between the second component and the rear 24 of the vehicle, without being offset to the side, above or below the second component. Thus, the motor 47, in particular, is located in the vehicle installed fan assembly 40 adjacent to the battery-pack 34, and between the battery-pack 34 and rear 34 of the vehicle, without being offset to one of the sides 26 of the vehicle (relative to the battery-pack 34), or offset above or below the battery pack.

The response of various components of the vehicle 20, should the vehicle be subjected to a rear impact event, will now be discussed. In a significant rear impact event, the floor 32 begins to crush, which will tend to cause the floor 32 to push upward on the lower, rear portion of the fan assembly 40. As the floor 32 pushes into the fan assembly 40, the mounting flanges 54 will tend to slip upward relative to the fasteners 59, with the bottom openings 58 of the U-slots 56 allowing the mounting flanges 54 to eventually slip free of the fasteners 59. This allows the portion of the fan assembly 40 contacting the battery-pack housing 36 to slip upward and over the top of the battery-pack 34.

Also, as the floor 32 begins to crush, the fan assembly 40 will tend to pivot about the fastener 66 securing the support arm 62 to the floor 32. Thus, the fan assembly 40, overall, pivots about this fastener 66 upward over the battery-pack 34, minimizing the potential for the fan assembly 40, and in particular the motor 47 from being pushed into the battery-pack 34 far enough to damage internal components of the battery-pack 34.

While certain embodiments of the present invention have been described in detail, those familiar with the art to which this invention relates will recognize various alternative designs and embodiments for practicing the invention as defined by the following claims.

What is claimed is:

1. A vehicle comprising:

vehicle structure including a pair of opposed sides and a rear, with a floor extending horizontally between the sides and rear;

a battery-pack mounted above the floor;

a fan assembly having a housing with a motor mounted therein directly behind the battery-pack, the housing including a pair of flanges having U-slots with slot openings facing downward;

fasteners extending horizontally through the U-slots and secured to the battery-pack.

2. The vehicle of claim 1 wherein the housing includes a support arm extending downward to the floor, with a hole through the support arm, and a fastener extending through the hole and secured to the floor.

3. The vehicle of claim 2 wherein the hole through the support arm is circular, and wherein the housing is pivotable about the circular hole in a vehicle rear impact event.

4. The vehicle of claim 1 wherein the housing of the fan assembly includes a pair of ducts in fluid communication with the battery-pack.

5. The vehicle of claim 4 wherein the housing of the fan assembly includes an outlet duct in fluid communication with the vehicle rearward of the fan assembly.

6. The vehicle of claim 1 wherein the housing of the fan assembly includes an outlet duct in fluid communication with the vehicle rearward of the fan assembly.

7. The vehicle of claim 1 wherein the housing of the fan assembly is formed of plastic.

8. A vehicle comprising:

vehicle structure including a pair of opposed sides and a rear, with a floor extending horizontally between the sides and rear;

a passenger compartment having rear seats mounted therein;

a battery-pack mounted above the floor behind the rear seats, the battery-pack including a housing in fluid communication with the passenger compartment;

a fan assembly having a housing with a motor mounted therein directly behind the battery-pack, the housing including a pair of flanges having U-slots with slot openings facing downward; and fasteners extending horizontally through the U-slots and secured to the housing of the battery-pack.

9. The vehicle of claim 8 wherein the housing of the fan assemblies includes a support arm extending downward to the floor, with a hole through the support arm, and a fastener extending through the hole and secured to the floor.

10. The vehicle of claim 9 wherein the hole through the support arm is circular, and wherein the housing is pivotable about the circular hole in a vehicle rear impact event.

11. The vehicle of claim 8 wherein the housing of the fan assembly includes a pair of ducts in fluid communication with the housing of the battery-pack.

12. The vehicle of claim 11 wherein the housing of the fan assembly includes an outlet duct in fluid communication with the vehicle rearward of the fan assembly.

13. The vehicle of claim 8 wherein the housing of the fan assembly is formed of plastic.

* * * * *